United States Patent
Lyle et al.

(10) Patent No.: US 6,878,902 B2
(45) Date of Patent: Apr. 12, 2005

(54) PORTABLE COMPUTER SYSTEM WITH HAND-WARMING

(75) Inventors: Ruthie D. Lyle, Durham, NC (US); Jamel P. Lynch, Jr., Carrboro, NC (US); McGill Quinn, Durham, NC (US); William Vigilante, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/629,961

(22) Filed: Jul. 30, 2003

(65) Prior Publication Data

US 2005/0023265 A1 Feb. 3, 2005

(51) Int. Cl.[7] .............................. H05K 7/20; A21B 1/26
(52) U.S. Cl. ........................................ 219/209; 361/687
(58) Field of Search ................................ 361/676–678, 361/680, 687, 688, 690–697; 219/209

(56) References Cited

U.S. PATENT DOCUMENTS

| | | | |
|---|---|---|---|
| 4,605,840 A | * | 8/1986 | Koopman ................... 219/401 |
| 5,193,523 A | | 3/1993 | Denber |
| 5,513,070 A | | 4/1996 | Xie et al. |
| 5,828,034 A | * | 10/1998 | Chang ......................... 219/209 |
| 6,029,901 A | * | 2/2000 | Toy, II ......................... 239/55 |
| 6,094,347 A | * | 7/2000 | Bhatia ......................... 361/695 |
| 6,115,540 A | | 9/2000 | Klopotek |
| 6,135,876 A | * | 10/2000 | Song et al. .................. 454/184 |
| 6,411,505 B1 | * | 6/2002 | DiFonzo et al. ............ 361/683 |
| 6,439,328 B1 | * | 8/2002 | Vaillancourt et al. ......... 165/98 |
| 6,646,226 B1 | * | 11/2003 | Reitz ........................... 219/209 |
| 2002/0164944 A1 | * | 11/2002 | Haglid ........................ 454/228 |

FOREIGN PATENT DOCUMENTS

DE    19638812    3/1998

* cited by examiner

*Primary Examiner*—Teresa J. Walberg
(74) *Attorney, Agent, or Firm*—Sawyer Law Group LLP

(57) ABSTRACT

Aspects of a portable computer system capable of warming a user's hands are described. The portable computer system includes a lid, the lid housing a display screen and a base, the base hingedly coupled to the lid and housing processing hardware beneath a keyboard unit. The base further includes an adjustable ventilation interface that allows an alteration to a direction of warm air dispersing heat generated by operation of the processing hardware. The ventilation interface includes a plurality of vent openings and a mechanical controller substantially adjacent to the plurality of vent openings to adjust closure of the plurality of vent openings.

19 Claims, 2 Drawing Sheets

PORTABLE COMPUTER SYSTEM WITH HAND-WARMING

FIELD OF THE INVENTION

The present invention relates to portable computer systems and more particularly to a portable computer system with hand-warming.

BACKGROUND OF THE INVENTION

A significant number of computer users prefer the mobility and convenience that portable computer systems offer. Design features try to anticipate and accommodate the needs of the mobile computer user, including providing durability during travel, reduced weight, and efficient power consumption, without compromising expected computing capabilities. As the needs of the mobile computer user continue to be met, the types of environments in which the portable computer system is used continue to grow. Thus, meeting the needs of the mobile computer user is ever-evolving due to the variety of conditions in which the portable computer systems are used.

One variance in the conditions of portable computer system use is the temperature of the surroundings. For example, whether within a conventional office environment or outside of the conventional office environment, each user can have a variable comfort level with respect to the temperature in which they work. Consequently, while one person may feel quite comfortable in a given environment, another person may feel chilly. More particularly, the nature of computer system work usually requires exposed hands and fingers in order to utilize the keyboard as a main input device to the computer system.

The wide variance that is common for hand and finger temperature creates a need for accommodating those portable computer system users who would benefit from having warmer hands and fingers during their use of the portable computer system. The present invention addresses such a need.

SUMMARY OF THE INVENTION

Aspects of a portable computer system capable of warming a user's hands are described. The portable computer system includes a lid, the lid housing a display screen and a base, the base hingedly coupled to the lid and housing processing hardware beneath a keyboard unit. The base further includes an adjustable ventilation interface that allows an alteration to a direction of warm air dispersing heat generated by operation of the processing hardware. The ventilation interface includes a plurality of vent openings and a mechanical controller substantially adjacent to the plurality of vent openings to adjust closure of the plurality of vent openings.

Through the present invention, a straightforward solution allows a portable computer user to select and control a hand-warming feature. These and other advantages of the aspects of the present invention will be more fully understood in conjunction with the following detailed description and accompanying drawings.

DETAILED DESCRIPTION OF THE INVENTION

The present invention relates to a portable computer system with hand-warming. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
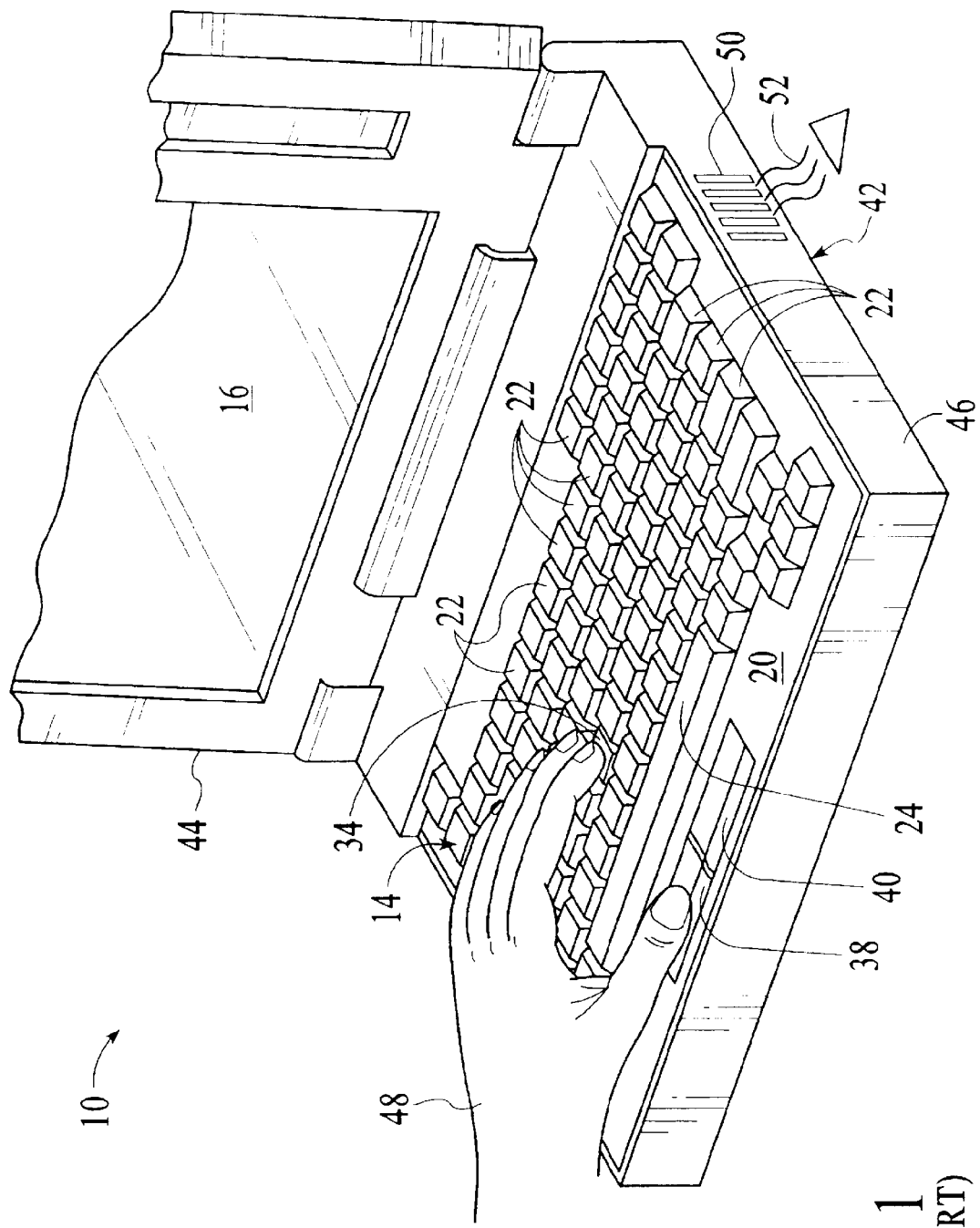
FIG. 1 illustrates a prior art portable computer system.

Referring to FIG. 1, a typical portable computer system 10, such as an IBM ThinkPad (TM), is illustrated which comprises a host processor/processing hardware (not shown) that receives manual control inputs from an attached keyboard unit 14 and displays system responses on a display screen 16 of a display device, as is commonly understood. The keyboard unit 14 includes a surrounding rectangular frame 20 that supports a plurality of manually depressible keys (as marked in part by numeral 22). The keys 22 include the normal twenty-six keys bearing the letters of the alphabet which are arranged in the conventional QWERTY layout. The keys 22 also include conventional F1 through F12 function keys, and other keys such as CAPS LOCK, SHIFT, TAB, BACKSPACE, ENTER and so forth, as well as a SPACE BAR key 24, CTRL key(s), ALT key(s), etc.

As is typical for ThinkPad(TM) systems, the keyboard unit 14 is shown having a small, substantially rigid joystick actuator 34 embedded therein, e.g., between the 'G', 'H' and 'B' keys. The joystick actuator 34 can be engaged by the tip of the user's index finger and lateral forces applied over a 360 degree range in the general horizontal plane of the keyboard unit 14 in order to move an active pointer across the entire display screen 16, such as to select icons, windows and other commands displayed by the GUI and to designate system tasks, change the display, and so forth. Of course, movement of the active pointer may occur via other types of selectors, for example, a touchpad that is responsive to a user's finger movement.

The keyboard unit 14 further includes a pair of click button assemblies 38 and 40, e.g., mounted in side-by-side relationship rearward of the space bar 24 in the wrist support of the frame 20. The click button assemblies 38 and 40 are well known to serve the same function as the click buttons on the conventional mouse widely used with personal computers.

The display screen 16 is carried on the inside of a lid 44 which is hingedly attached to the base 46 which houses the host processor/processing hardware beneath the keyboard unit 14. The lid 44 can be closed to conceal the keyboard unit 14, as is well understood in the art. As is further shown, the index finger and thumb of a user's left hand 48 are shown in engagement with the joystick actuator 34 and click button assembly 38, respectively. Of course, a user's right hand (not depicted) is also usually engaged with the keyboard 14 to select keys when typing/inputting data to the computer system 10.

Normally, portable computer systems use fans (not shown) to propel air under the keyboard unit 14 through vent openings 50 in the base 46 (shown as arrow 52) in order to dispel some of the heat generated by the host processor/processing hardware of the computer system 10. In accordance with the present invention, the vent openings 50 on the keyboard unit 14 are controlled to send the warm air they normally disperse away from the keyboard unit 14 up between the keys 22 and onto the fingers/hand 48 of the user of the keyboard unit 14 to keep the user's fingers/hand 48 warm.

Figure 2:
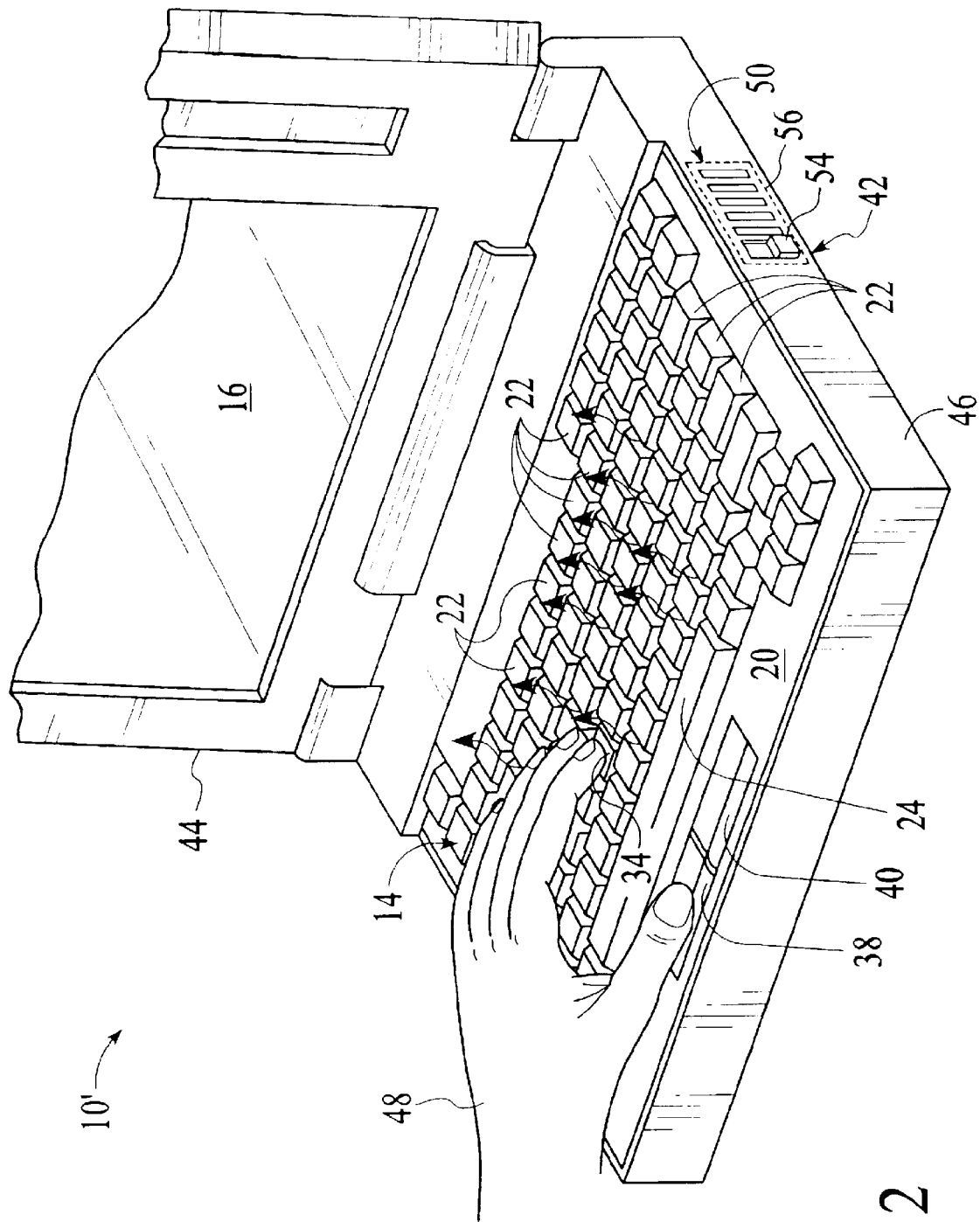
FIG. 2 illustrates a portable computer system in accordance with the present invention.

Referring now to FIG. 2, FIG. 2 illustrates a portable computer system 10' in accordance with the present invention that enhances the portable computer system 10 shown in FIG. 1 by including a mechanical controller 54 to allow for the control of the vent openings 50, i.e., forming an adjustable ventilation interface (labeled as dashed box 56). Preferably, the mechanical controller 54 is provided substantially adjacent to the vent openings 50 and is moved by the user to adjust the vent openings 50, e.g., the mechanical controller 54 slides to move a barrier into position behind the vent openings 50 allowing a full range of venting options, i.e., a range for the vent openings 50 between fully opened and fully closed. As the mechanical controller 54 is adjusted to close the vent openings 50, the warm air normally dispersed through the vent openings 50 is forced upward through the keyboard 14 between the keys 22 (represented by the arrows shown among the keys 22) and onto the user's fingers/hand 48. In situations where the user no longer requires the air flow to warm the fingers, the mechanical controller 54 is adjusted to allow the warm air to disperse away from the keyboard 14 in the typical manner through the vent openings 50.

Thus, through the present invention, a straightforward solution allows a portable computer user to select and control a hand-warming feature. The present invention performs the hand-warning by utilizing heat already present in the portable computer and therefore does not require the addition of a heat source or external heat application/delivery to the keyboard. In this manner, convenience in accommodating the potential needs of the portable computer system user is successfully achieved.

Although the present invention has been described in accordance with the embodiments shown, one of ordinary skill in the art will readily recognize that there could be variations to the embodiments and those variations would be within the spirit and scope of the present invention. For example, it should be appreciated that the vent openings depicted are illustrative and not restrictive of the number and location of vent openings on a portable computer system. Further, the location of the vent openings may vary due to the presence of other device access points, e.g., CD/DVDs, floppy disk drives, audio output, network cards, etc., on the base. Accordingly, many modifications may be made by one of ordinary skill in the art without departing from the spirit and scope of the appended claims.

What is claimed is:

1. A portable computer system capable of warming a user's hands, the portable computer system comprising:
    a lid, the lid housing a display screen; and
    a base, the base hingedly coupled to the lid and housing processing hardware beneath a keyboard unit, the base comprising an adjustable ventilation interface that allows an alteration to a direction of warm air dispersing heat generated by operation of the processing hardware with a maximum delivery of the warm air to a user's hand when the adjustable ventilation interface is in a minimum open position.

2. The portable computer system of claim 1 wherein the ventilation interface further comprises a plurality of vent openings and a mechanical controller substantially adjacent to the plurality of vent openings to adjust closure of the plurality of vent openings.

3. The portable computer system of claim 2 wherein the mechanical controller slides in response to movement selected by a user of the portable computer system.

4. The portable computer system of claim 3 wherein the mechanical controller slides to allow a range of closure of the plurality of vent openings between a fully opened and a fully closed position.

5. The portable computer system of claim 4 wherein the fully closed position of the plurality of vent openings forces the warm air in a direction upward through the keyboard unit.

6. The portable computer system of claim 4 wherein the fully opened position forces the warm air in a direction outward though the plurality of vent openings.

7. A system for achieving a hand-warming feature in a portable computer system, the system comprising:
    means for dispersing heat through vents during utilization of a portable computer system; and
    means for controlling the vents to alter a direction of the dispersed heat to allow a maximum delivery of the dispersed heat for hand-warming with the vents in a minimum open position.

8. The system of claim 7 wherein the means for controlling further comprises a mechanical controller substantially adjacent to the vents.

9. The system of claim 8 wherein the means for controlling alters the direction of the dispersed heat by closing the vents.

10. The system of claim 9 wherein the direction alters from a flow outward through the vents to a flow upward through a keyboard unit of the portable computer system.

11. The system of claim 7 wherein the means for controlling provides a range of closure of the vents between a position of fully opened and a position of fully closed.

12. A method for achieving a hand-warming feature in a portable computer system, the method comprising:
    providing a ventilation interface in a base of a portable computer system to assist in heat dispersal during operation of the portable computer system; and
    controlling the ventilation interface to adjust a direction of the heat dispersal and produce hand-warming for a user of the portable computer system at a maximum level when the ventilation interface is in a minimum open position.

13. The method of claim 12 wherein providing a ventilation interface further comprises providing a plurality of vent openings in a side of a base of the portable computer system.

14. The method of claim 13 wherein providing a ventilation interface further comprises providing a mechanical controller substantially adjacent to the plurality of vent openings for selection of a position of the plurality of vent openings.

15. The method of claim 14 wherein the position of the plurality of vent openings further comprises a range of positions between fully opened and fully closed.

16. The method of claim 15 further comprising adjusting the mechanical controller to adjust the range of positions.

17. The method of claim 16 wherein adjusting the mechanical controller alters direction of the heat dispersal from a direction outward through the plurality of vent openings to a direction upward through the base.

18. The method of claim 17 wherein the direction upward through the base further comprises a direction upward through a keyboard unit of the portable computer system.

19. The method of claim 18 wherein the direction upward through the keyboard unit further comprises heat dispersal between keys of the keyboard unit and onto hands of the user of the portable computer system.

* * * * *

UNITED STATES PATENT AND TRADEMARK OFFICE
CERTIFICATE OF CORRECTION

PATENT NO. : 6,878,902 B2 Page 1 of 1
APPLICATION NO. : 10/629961
DATED : April 12, 2005
INVENTOR(S) : Lyle, Ph.D. et al.

It is certified that error appears in the above-identified patent and that said Letters Patent is hereby corrected as shown below:

In column 3, line 26, delete "warning" and replace with --warming--.

Signed and Sealed this

Twenty-second Day of August, 2006

JON W. DUDAS
*Director of the United States Patent and Trademark Office*